(12) United States Patent
Urmanov et al.

(10) Patent No.: US 7,933,850 B1
(45) Date of Patent: Apr. 26, 2011

(54) METHOD AND APPARATUS FOR FUNCTIONAL RELATIONSHIP APPROXIMATION THROUGH NONPARAMETRIC REGRESSION USING R-FUNCTIONS

(75) Inventors: Aleksey M. Urmanov, San Diego, CA (US); Kenny C. Gross, San Diego, CA (US); Anton A. Bougaev, Lafayette, IN (US)

(73) Assignee: Oracle America, Inc., Redwood Shores, CA (US)

( * ) Notice: Subject to any disclaimer, the term of this patent is extended or adjusted under 35 U.S.C. 154(b) by 493 days.

(21) Appl. No.: 11/598,608

(22) Filed: Nov. 13, 2006

(51) Int. Cl.
*G06E 1/00* (2006.01)
*G06E 3/00* (2006.01)
*G06G 7/00* (2006.01)

(52) U.S. Cl. ........................................................ 706/20
(58) Field of Classification Search ..................... 706/20
See application file for complete search history.

(56) References Cited

U.S. PATENT DOCUMENTS

2003/0107548 A1* 6/2003 Eun et al. ...................... 345/156

OTHER PUBLICATIONS

Kotsiantis et al. "Bagging Model Trees for Classification Problems", LNCS, vol. 3746/2005, Springer Berlin/Heidelberg, pp. 328-337.*
Bougaev et al. "R-functions Based Classification for Abnormal Software Process Detection", CIS, 2005, Part 1, LNAI 3801, pp. 991-996.*
Smola, et al. "A Tutorial on Support Vector Regression", Statistics and Computing, 2003, pp. 1-24).*
Shapiro, Vadim Theory of R-Functions and Applications: A Primer, Nov. 1988 (Revised Jun. 1991), http://sal-cnc.me.wisc.edu/index.php?option=com_remository&Itemid=143&func=startdown&id=47, downloaded May 12, 2009.

* cited by examiner

*Primary Examiner* — Donald Sparks
*Assistant Examiner* — Li-Wu Chang
(74) *Attorney, Agent, or Firm* — Park, Vaughan & Fleming LLP (57) ABSTRACT

One embodiment of the present invention provides a system that constructs a functional relationship approximation from a set of data points through nonparametric regression. During operation, the system receives a training data set in an n-dimensional space. Next, the system defines a set of regression primitives in the n-dimensional space, wherein a regression primitive in the set passes through N data points in the training data set, wherein $N \geq n$. The system then logically combines the set of regression primitives to produce a convex envelope F, such that for each point p in the n-dimensional space: (1) $F(p)=0$, if p is on the convex envelope; (2) $F(p)<0$, if p is inside the convex envelope; and (3) $F(p)>0$, if p is outside the convex envelope. The system next obtains the functional relationship approximation by computing an argument of the minimum of F in the n-dimensional space. The system subsequently uses the functional relationship approximation to classify data.

20 Claims, 5 Drawing Sheets
(3 of 5 Drawing Sheet(s) Filed in Color)

METHOD AND APPARATUS FOR FUNCTIONAL RELATIONSHIP APPROXIMATION THROUGH NONPARAMETRIC REGRESSION USING R-FUNCTIONS

BACKGROUND

1. Field of the Invention

The present invention relates to techniques for detecting faults in systems. More specifically, the present invention relates to a method and apparatus that approximates a functional relationship from a training data through nonparametric regression, and uses the approximated functional relationship to inferentially estimate a system variable.

2. Related Art

Modern server systems are typically equipped with a significant number of sensors which monitor signals during the operation of the server systems. For example, these monitored signals can include temperatures, voltages, currents, and a variety of software performance metrics, including CPU usage, I/O traffic, and memory utilization. Outputs from this monitoring process can be used to generate time series data for these signals which can subsequently be analyzed to determine how well a computer system is operating.

One particularly useful application of this analysis technique is to facilitate proactive fault detection and monitoring to identify leading indicators of component or system failures before the failures actually occur. Typically, this is achieved by detecting anomalies in the signals which may potentially lead to system failures.

One proactive fault detection and monitoring technique employs functional relationship approximation techniques to predict normal system data values based on other collected information (i.e. "inferential estimation"). Conventional functional relationship approximation techniques can be divided into two categories: parametric techniques and nonparametric techniques.

The parametric techniques make distributional assumptions about underlying data generating mechanisms and detect failures in data sets based on parametric models. However, the results of these parametric techniques suffer from the errors in the distributional assumptions which are used to predict the data generating mechanisms.

On the other hand, the nonparametric techniques do not make distributional assumptions on the data to be modeled. In other words, a nonparametric technique has no (or very little) a priori knowledge about the form of the functional relationship which is being estimated. Although the functional relationship is still modeled using an equation containing free parameters, the nonparametric methods allow the class of functions which the model can represent to be very broad. Furthermore, the nonparametric techniques typically use a large number of free parameters, whereas the parametric techniques typically use only a small number of parameters.

Note that some of the most frequently referenced nonparametric methods include artificial neural networks, kernel regression, support vector machines, and autoassociative memory-based techniques.

Unfortunately, these conventional nonparametric techniques suffer from one or several of the following problems: (1) they require large training data sets to produce accurate predictions, in particular for multidimensional cases; (2) they are computationally intensive because of the iterative nature of learning algorithms; (3) they produce inconsistent estimates of the approximated values due to stochastic optimization of weights; (4) they produce numerically unstable estimates; and (5) they require careful tuning of a bandwidth parameter or careful preprocessing of the training data set.

Hence, what is needed is a nonparametric functional relationship approximation method without the above-described problems.

SUMMARY

One embodiment of the present invention provides a system that constructs a functional relationship approximation from a set of data points through nonparametric regression. During operation, the system receives a training data set in an n-dimensional space. Next, the system defines a set of regression primitives in the n-dimensional space, wherein a regression primitive in the set passes through N data points in the training data set, wherein $N \geq n$. The system then logically combines the set of regression primitives to produce a convex envelope F, such that for each point p in the n-dimensional space: (1) $F(p)=0$, if p is on the convex envelope; (2) $F(p)<0$, if p is inside the convex envelope; and (3) $F(p)>0$, if p is outside the convex envelope. The system next obtains the functional relationship approximation by computing an argument of the minimum of F in the n-dimensional space. The system subsequently uses the functional relationship approximation to classify data.

In a variation on this embodiment, the system classifies the data by determining whether a telemetry signal from a computer system is deviating from a normal telemetry signal from the computer system.

In a variation on this embodiment, the system defines the set of regression primitives in the n-dimensional space by iteratively: selecting a set of N data points from the training data set; and generating a regression primitive which passes through the selected N data points. The system ensures that between any two sets of selected N data points, there is at least one different data point in each of the sets.

In a variation on this embodiment, a regression primitive can be a linear function or a nonlinear function.

In a variation on this embodiment, a regression primitive defines a hyperplane $g(p)=0$ in the n-dimensional space. This hyperplane $g(p)=0$ divides the n-dimensional space into three regions such that for each point p: (1) $g(p)=0$, if p is on the hyperplane; (2) $g(p)<0$, if p is on one side of the hyperplane; and (3) $g(p)>0$, if p is on the other side of the hyperplane.

In a variation on this embodiment, the system logically combines the set of regression primitives by using R-function operations, wherein an R-function is a function whose sign can change if and only if the sign of one of its arguments changes, and the R-function operations mimic logical operations.

In a variation on this embodiment, the system logically combines the set of regression primitives to produce the convex envelope F by: for each subset of (N−1) data points in the training data set, grouping a subset of regression primitives in the set which pass through the (N−1) data points; and performing an R-conjunction operation on the subset of regression primitives to produce a combined functional relationship associated with the (N−1) data points. The system then performs an R-disjunction operation on a set of combined functional relationship associated with different subsets of (N−1) data points in the training data set to produce the convex envelope F.

In a variation on this embodiment, each data point in the training data set comprises one dependent variable y and (n−1) independent variables, wherein the value of y is functionally related to the values of x.

In a further variation on this embodiment, prior to defining the set of regression primitives, the system preprocesses the received training data set by: receiving a query point $x=x_0$; selecting k-nearest-neighbors of $x_0$ from the training data set; and replacing the training data set with the k data points associated with the k-nearest-neighbors of $x_0$.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Real-Time Telemetry System

Figure 1:
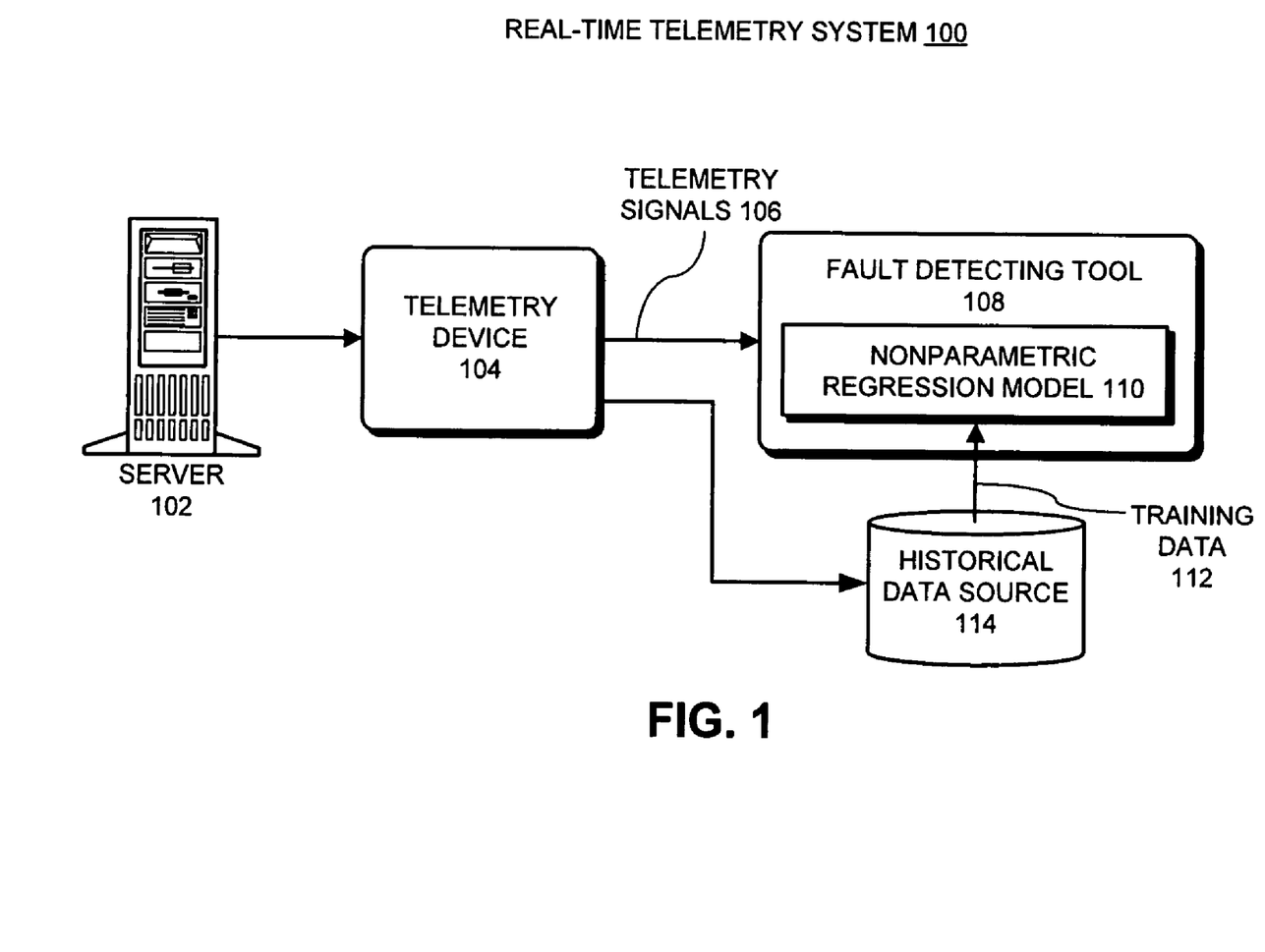
FIG. 1 illustrates real-time telemetry system in accordance with an embodiment of the present invention.

FIG. 1 illustrates real-time telemetry system 100 in accordance with an embodiment of the present invention. Real-time telemetry system 100 contains server 102. Server 102 can generally include any computational node including a mechanism for servicing requests from a client for computational and/or data storage resources. In the present embodiment, server 102 is a uniprocessor or multiprocessor server system that is being monitored by real-time telemetry system 100.

Note that the present invention is not limited to the computer server system illustrated in FIG. 1. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Real-time telemetry system 100 also contains telemetry device 104, which gathers telemetry signals 106 from the various sensors and monitoring tools within server 102, and directs telemetry signals 106 to a local or a remote location that contains fault-detecting tool 108. In one embodiment of the present invention, telemetry device 104 and fault-detecting tool 108 are both embedded in server 102 which is being monitored.

Note that telemetry signals 106 gathered by real-time telemetry system 104 can include signals associated with physical and/or software performance parameters measured through sensors within the computer system. The physical parameters can include, but are not limited to: distributed temperatures within the computer system, relative humidity, cumulative or differential vibrations within the computer system, fan speed, acoustic signals, currents, voltages, time-domain reflectometry (TDR) readings, and miscellaneous environmental variables. The software parameters can include, but are not limited to: load metrics, CPU utilization, idle time, memory utilization, disk activity, transaction latencies, and other performance metrics reported by the operating system.

Fault-detecting tool 108 monitors and analyzes telemetry signals 106 in real-time. Specifically, fault-detecting tool 108 detects anomalies in telemetry signals 106 and by analyzing telemetry signals 106, predicts probabilities of specific faults and failures in server 102.

More specifically, fault-detecting tool 108 includes a non-parametric regression model 110. Note that nonparametric regression model 110 receives training data 112 from historical data source 114, which contains well-behaved data (in particular, signal values as a function of other system variables) previously collected from telemetry device 104. Non-parametric regression model 110 uses training data 112 to construct a functional relationship approximation for telemetry signals 106.

Fault-detecting tool 108 then uses the functional relationship approximation to estimate the signal values of the monitored telemetry signals as a function of other system metrics (e.g., temperatures, currents, loads, I/O activities), and compares the predicted signal values with the currently received signal values. Fault-detecting tool 108 subsequently detects anomalies in telemetry signals 106 if the currently received signal values deviate from the predicted normal signals values based on the functional relationship approximation.

Constructing a Functional Relationship Approximation

Regression Primitive Definition

A regression primitive is defined as a function $g(p; [k])$ in vector space $R^{d+1}$ ($d \geq 1$) with one variable p and a vector parameter $[k]$, wherein $p=[y, x]$, wherein y is in one-dimensional space R, and x is in vector space $R^d$, and $[k]=[p_1, p_2, \ldots, p_k]$, wherein $p_i$ is in vector space $R^{d+1}$, $i=1, 2, \ldots, k$, and $k \geq d+1$.

The simplest regression primitive is defined by a linear function $g_{lin}(p;[2])$ in $R^2$ ($d=1$), wherein points p which make $g_{lin}(p;[2])=0$ define a line in $R^2$ passing through two points $p_1=[y_1, x_1]$ and $p_2=[y_2, x_2]$. Note that the equation for this line can be written as:

$$g_{lin}(p;[2]) = \left\| \begin{array}{ccc} y & x & 1 \\ y_1 & x_1 & 1 \\ y_2 & x_2 & 1 \end{array} \right\|. \tag{1}$$

Similarly in vector space $R^3$ (i.e., in three-dimensional space), a linear regression primitive $g_{lin}(p;[3])=0$ is defined by a plane passing through three points $p_1$, $p_2$, $p_3$ in $R^3$. Generally, for points p in $R^{d+1}$ wherein $d+1 > 3$, $g_{lin}(p;[d+1])=0$ defines a hyperplane passing through $(d+1)$ points $p_i$, wherein $i=1, 2, \ldots, d+1$. Note that although we used linear functions to describe a regression primitive, regression primitives can also include nonlinear functions.

Obtaining a Functional Approximation from Training Data

A training data set D comprises N data points in $R^{d+1}$, wherein each data point $p_n=[y_n, x_n]$, where $y_n$ is in R, $x_n$ is in $R^d$, and $n=1, 2, \ldots, N$.

Given the training data set D and a query point x in $R_d$, the problem we would like to solve is to provide an estimate of y in R as a function of the query point x based on the training data set D.

We first construct a set of regression primitives from the training data set D, wherein each of the regression primitive is defined as:

$$g([y,x]; [p_{i\_1}, p_{i\_2}, \ldots p_{i\_(d+1)}]), i\_1 \neq i\_2 \neq \ldots \neq i\_(d+1). \tag{2}$$

Next, the set of regression primitives are logically combined into a single function by using R_disjunction and R_conjunction operations (For the definition of the R-conjunction and R-disjunction operations see reference V. Shapiro, "Theory of R-functions and Applications: A Primer," Technical Report, Cornell University, 1991). We describe this process in more detail below.

Figure 2:
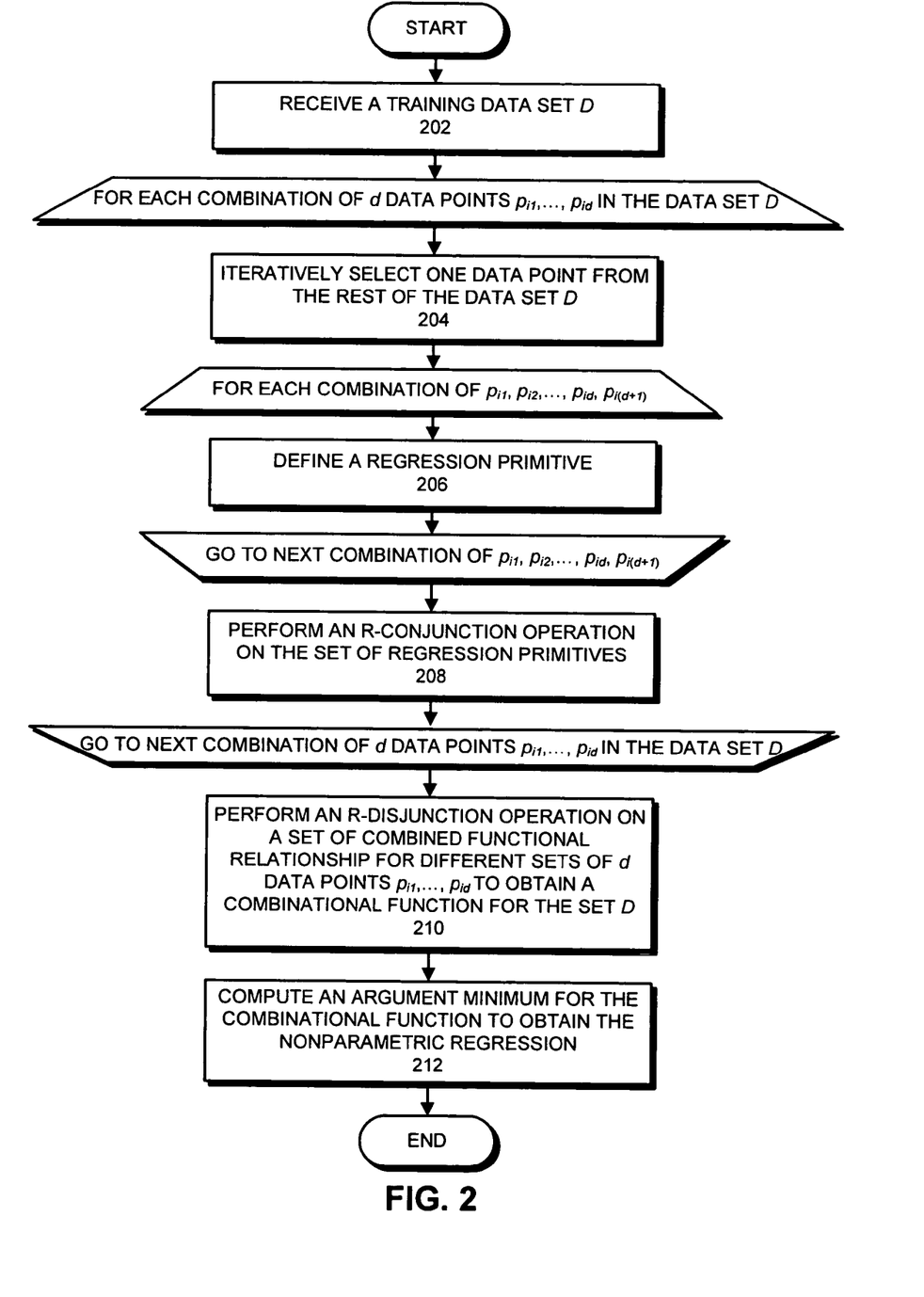
FIG. 2 presents a flowchart illustrating the process of constructing a functional relationship approximation from the training data set in accordance with an embodiment of the present invention.

FIG. 2 presents a flowchart illustrating the process of constructing a functional relationship approximation from the training data set D in accordance with an embodiment of the present invention. The system first receives the training data set D, which contains well-behaved data values of $p_n=[y_n, x_n]$ (step 202).

Next, for a subset of d data point $\{p_{i1}, p_{i2}, \ldots, p_{id}\}$ in the data set D, the system iteratively selects one data point from the rest of the data set D excluding $\{p_{i1}, p_{i2}, \ldots, p_{id}\}$ (step 204). Note that each such selection is unique in that there should be at least one different data point between any two such selections. Each unique combination of $p_{i1}, p_{i2}, \ldots, p_{i(d+1)}$ is then used to define a regression primitive as previously described (step 206). Consequently, the system obtains a set of regression primitives associated with the subset $\{p_{i1}, p_{i2}, \ldots, p_{id}\}$.

The system next performs an R_conjunction operation on these regression primitives to obtain a single logically combined functional relationship with respect to the subset $\{p_{i1}, p_{i2}, \ldots, p_{id}\}$ (step 208).

Next, the system repeats the above steps 204-208 for other subset of d data points in the data set D and subsequently obtains a set of combined function relationships with respect to each given subset of d data points in D. Finally, the system performs an R_disjunction operation on this set of combined functional relationships which obtains a single logical combination function $F([y, x])$ of all regression primitives which are defined based on the training data set D (step 210).

In one embodiment of the present invention, the logical combination function $F(y, x)$ forms a convex envelope (or convex hull) in the vector space $R^{d+1}$, such that for each point $p=[y, x]$ in $R^{d+1}$, the following expressions hold:

$F(p)=0$; if p is on the convex envelope;

$F(p)<0$; if p is inside the convex envelope; and $F(p)>0$; if p is outside the convex envelope; (3)

The system then computes the arguments of the minimum of $F(y, x)$, arg $\min\{F(y, x)\}$, i.e., the values of the arguments $(y, x)$ for which the values of $F(y, x)$ attains minimum values (step 212). Note that the operation arg $\min\{F(y, x)\}$ generates a new functional relationship $\hat{y}=\arg\min_{-y}\{F(y, x)\}$ for y, which provides the functional relationship approximation for each query point x.

In summary, we can express $\hat{y}$ in terms of Eqn. (2) as the following:

$$\hat{y} = \arg\min_y \{ \bigvee (\bigwedge g([y, x]; [\{p_{i\_1}, p_{i\_2}, \ldots, p_{i\_(d+1)}\}]))\}, \tag{4}$$

for different $\{p_{i1}, p_{i2}, \ldots, p_{id}\}$ for each $\{p_{i1}, p_{i2}, \ldots, p_{id}\}$ and $p_{i(d+1)} \neq p_{i1}, p_{i2}, \ldots, p_{id}$ wherein the symbol "$\vee$" designates the R-disjunction operation, and the symbol "$\wedge$" designates the R-conjunction operation, which are both defined in the reference.

As a simple example, let's assume we receive a training data set D with four data points $D=\{p_1, p_2, p_3, p_4\}$, wherein $p_i$ is in $R^2$, $i=1, 2, 3, 4$. Eqn. (4) then takes the following form:

$$\hat{y} = \arg\min_y \{ (g([y, x];[p_1, p_2]) \wedge g([y, x];[p_1, p_3]) \wedge g([y, x];[p_1, p_4])) \vee$$
$$(g([y, x];[p_2, p_1]) \wedge g([y, x];[p_2, p_3]) \wedge g([y, x];[p_1, p_4])) \vee$$
$$(g([y, x];[p_3, p_1]) \wedge g([y, x];[p_3, p_2]) \wedge g([y, x];[p_3, p_4])) \vee$$
$$(g([y, x];[p_4, p_1]) \wedge g([y, x];[p_4, p_2]) \wedge g([y, x];[p_4, p_3]))\}$$

Variations from the Above Procedure

In a variation of the above described embodiment, a given training data set D is preprocessed for a given query point x using the k nearest neighbor (kNN) technique. Specifically, we first select k nearest neighbors of x from D. Next, we estimate $\hat{y}$ using Eqn. (4) with only the selected k data points as the actual training data set.

In another variation of the above described embodiment, an estimation for $\hat{y}$ is computed as a weighted sum according to the following equation:

$$\hat{y} = \sum_i y_i \cdot w_i, i = 1, 2, \ldots, I, \text{ and } y_{lo} < y_i < y_{hi}, \quad (5)$$

wherein the weights $w_i$ are given by:

$$w_i = \{ \vee \wedge g([y_i, x]; [p_{i\_1}, \ldots, p_{i\_(d+1)}]) \} \Big/ \quad (6)$$
$$\sum_i (\vee \wedge g([y_i, x]; [p_{i\_1}, \ldots, p_{i\_(d+1)}]))),$$

and $y_{lo}$, and $y_{hi}$, are chosen based on observed or expected spread (e.g., max and min) of variable y. Number of term I is chosen empirically.

In yet another variation of the above described embodiment, the original training data set D is preprocessed for a given query point x using a clustering technique. Specifically, a cluster of points from D that point x belongs to is used to replace the original training data set in the equation to compute an estimate ŷ.

In yet another variation of the above described embodiment, the regression primitive is fitted into a k-tuple using the ordinary least squares method or a penalized least squares method. This is useful when k>(d+1).

EXAMPLE APPLICATIONS

The present invention describes a nonparametric regression technique of using "logical combination of regression primitives" (LCORP). The present invention (or the LCORP technique) was applied to a number of regression problems. In the first problem the LCORP technique was used to fit noisy data associated with a nonlinear function of one variable. The results of fitting by the LCORP technique are compared with the true function and also to the results of a traditional kernel regression fitting.

Figure 3A:
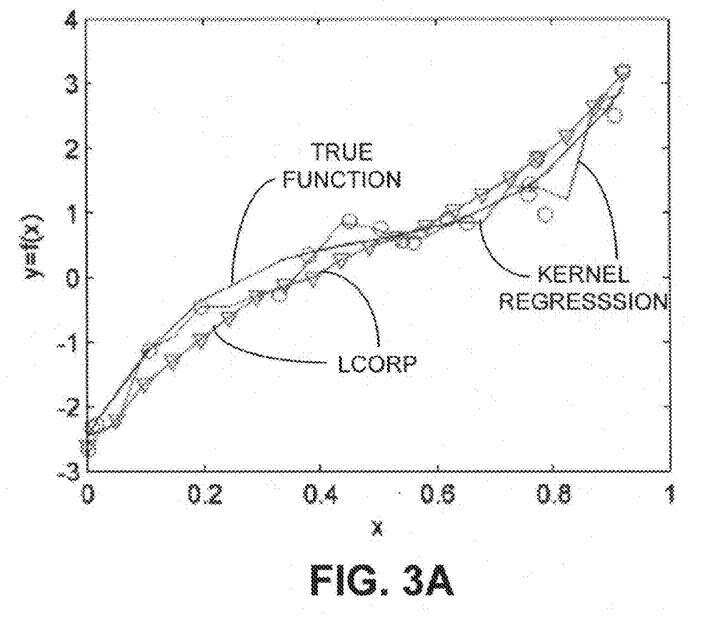
FIG. 3A illustrates one-dimensional function fitting results from noisy data by using the LCORP technique and a kernel regression technique in accordance with an embodiment of the present invention.

FIG. 3A illustrates one-dimensional function fitting results from noisy data by using the LCORP technique and a kernel regression technique in accordance with an embodiment of the present invention. The circles on the plot represent the noisy data used to fit the regression functions, and the curve passing through all the triangles is a functional relationship fitted using the LCORP technique. Note that the function fitting curve estimated using the LCORP technique is significantly more stable than that function fitting curve estimated by the traditional kernel regression.

Figure 3B:
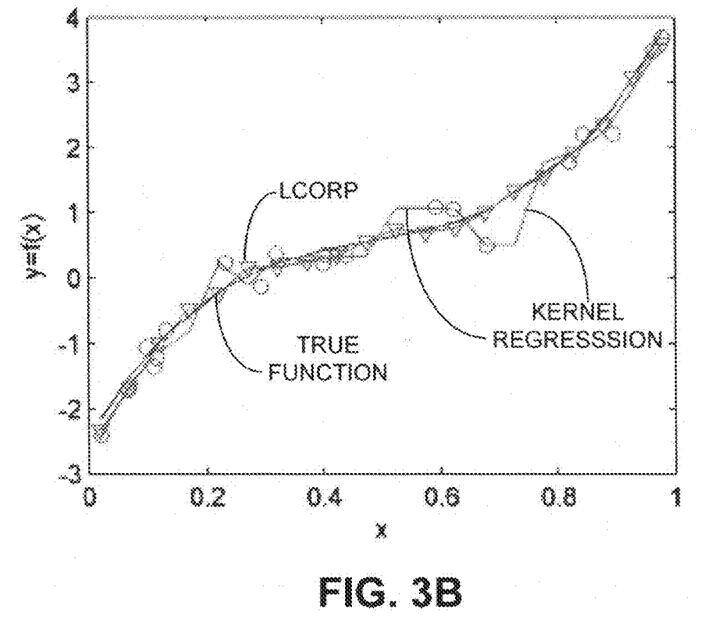
FIG. 3B illustrates one-dimensional function fitting results from noisy data by using the LCORP technique with the variation of using five nearest neighbors for each query point in accordance with an embodiment of the present invention.

FIG. 3B illustrates one-dimensional function fitting results from noisy data by using the LCORP technique with the variation of using five nearest neighbors for each query point in accordance with an embodiment of the present invention. The circles on the plots represent the noisy data used to fit the regression functions, and the curve passing through all the triangles is fitted using the LCORP technique. Note the function fitting curve estimated using the LCORP substantially overlaps with the true function curve.

Figure 4A:
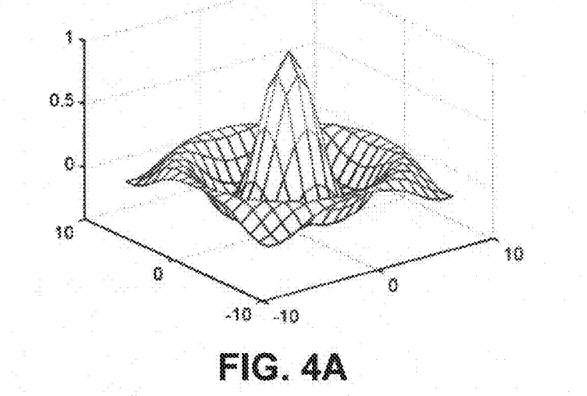
FIG. 4A illustrates a noise-free true two-dimensional function in accordance with an embodiment of the present invention.
Figure 4B:
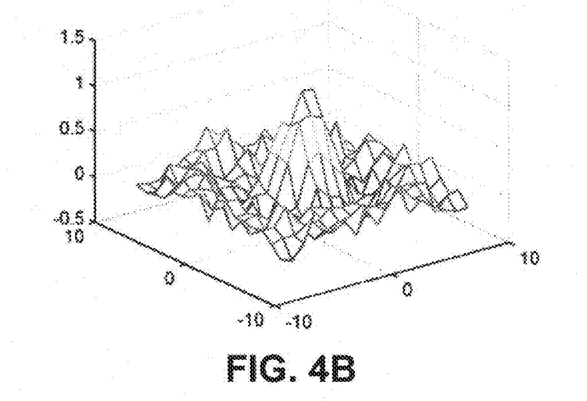
FIG. 4B illustrates the noisy data which are used to fit the true two-dimensional regression function using the LCORP technique in accordance with an embodiment of the present invention.
Figure 4C:
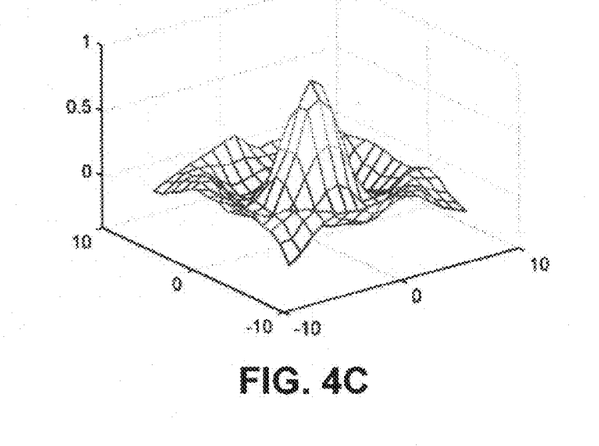
FIG. 4C illustrates the estimated two-dimensional regression function using the LCORP technique in accordance with an embodiment of the present invention.

FIGS. 4A-4C demonstrate using the LCORP to reconstruct a two-dimensional (2D) function from noisy data whose noise characteristics are similar to the noise characteristics of actual telemetry time series signals measured from computer servers.

FIG. 4A illustrates a noise-free true 2D function in accordance with an embodiment of the present invention. FIG. 4B shows the noisy data which are used to fit the true 2D regression function using the LCORP technique in accordance with an embodiment of the present invention. FIG. 4C illustrates the estimated 2D regression function using the LCORP technique in accordance with an embodiment of the present invention.

The last example demonstrates the application of the LCORP technique to inferential power estimation for a computer server. Note that some of server systems include power supplies which have embedded current sensors. These embedded current sensors can be used to produce real-time estimates of the dynamic power of the associated servers by aggregating all of the current signals. However, many other server systems use power supplies which do not have embedded current sensors. For these servers, the typical approach to measure the actual power for the servers is to use an expensive external hardware power meter. Note that if one can infer the power from other telemetry metrics in a server (e.g., loads, voltages, temperatures, IO metrics, etc.), it becomes possible to design a software application which can display on the console a "power meter" that provides the dynamic power as a function of these other telemetry metrics.

Figure 5:
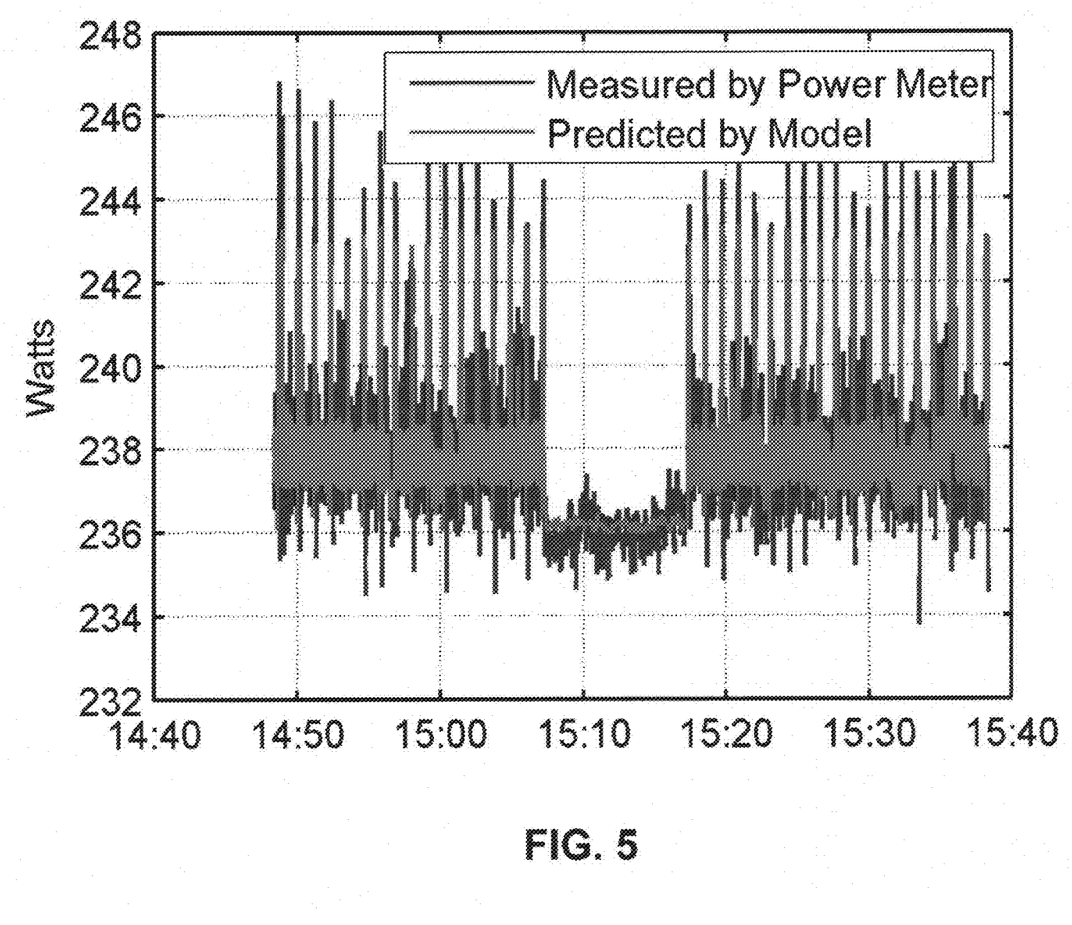
FIG. 5 illustrates the predicted power using the LCORP inferential model in comparison to the true power measured by power meter in accordance with an embodiment of the present invention.

One embodiment of the present invention facilitates using inferential telemetry signals measured from a server to predict the actual power of the server. Specifically, to build an LCORP inferential model to predict power as a dynamic function of the measured telemetry signals, a data set comprising measured telemetry metrics and the actual server power (in Watts) measured with an external power meter (for the purpose of cross-calibration of the LCORP technique) were obtained. FIG. 5 illustrates the predicted power using the LCORP inferential model in comparison to the true power measured by power meter in accordance with an embodiment of the present invention. For a demonstration, a short period of time was used to collect a training data set which covered both idle (lower power values) and busy state (higher power values) of the server (from 14:50 to 15:10 in FIG. 5). Note that the predicted power using the LCORP technique has an average error less than 1% of the actual power.

Although the results illustrated in FIG. 5 used only a subset of telemetry signals available from the server, in practice more complicated models can be built by simply adding more types of telemetry metrics (e.g., to also include distributed temperatures, fan speeds, and memory/CPU configuration data).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for constructing a functional relationship approximation from a set of data points through nonparametric regression, the method comprising:
    receiving a training data set in an n-dimensional space, wherein the training data set represents normal system data values from a system, wherein the normal system data values are collected from a system with a known-good behavior pattern;
    defining a set of regression primitives in the n-dimensional space, wherein a regression primitive in the set passes through N data points in the training data set, wherein $N \geq n$;

logically combining the set of regression primitives to produce a convex envelope F, wherein logically combining the set of regression primitives involves using R-function operations by, for each subset of (N−1) data points in the training data set, grouping a subset of regression primitives in the set which pass through the (N−1) data points; and performing an R-conjunction operation on the subset of regression primitives to produce a combined functional relationship associated with the (N−1) data points; and performing an R-disjunction operation on a set of combined functional relationship associated with different subsets of (N−1) data points in the training data set to produce the convex envelope F, such that for each point p in the n-dimensional space: $F(p)=0$ if p is on the convex envelope, $F(p)<0$ if p is inside the convex envelope, and $F(p)>0$ if p is outside the convex envelope;

using at least a computer for obtaining the functional relationship approximation by computing an argument of the minimum of F in the n-dimensional space, wherein the functional relationship approximation is constructed based on the training data set, and wherein the functional relationship approximation enables prediction of normal system behavior; and using the functional relationship approximation to classify data from the system.

2. The method of claim 1, wherein classifying the data involves determining whether a telemetry signal from a computer system is deviating from a normal telemetry signal from the computer system.

3. The method of claim 1, wherein defining the set of regression primitives in the n-dimensional space involves iteratively:

selecting a set of N data points from the training data set; and generating a regression primitive which passes through the selected N data points, wherein between any two sets of selected N data points, there is at least one different data point in each of the sets.

4. The method of claim 1, wherein a regression primitive can be:

a linear function; or a nonlinear function.

5. The method of claim 1, wherein a regression primitive defines a hyperplane $g(p)=0$ in the n-dimensional space;

wherein the hyperplane $g(p)=0$ divides the n-dimensional space into three regions such that for each point p:

$g(p)=0$ if p is on the hyperplane;

$g(p)<0$ if p is on one side of the hyperplane; and $g(p)>0$ if p is on the other side of the hyperplane.

6. The method of claim 1, wherein an R-function is a function whose sign can change if and only if the sign of one of its arguments changes; and wherein the R-function operations mimic logical operations.

7. The method of claim 1, wherein each data point in the training data set comprises:

one dependent variable y; and (n−1) independent variables x;

wherein the value of y is functionally related to the values of x.

8. The method of claim 7, wherein prior to defining the set of regression primitives, the method further comprises preprocessing the received training data set which involves:

receiving a query point $x=x_0$;

selecting k-nearest-neighbors of $x_0$ from the training data set; and replacing the training data set with the k data points associated with the k-nearest-neighbors of $x_0$.

9. A computer-readable storage medium storing instructions that when executed by a computer cause the computer to perform a method for constructing a functional relationship approximation from a set of data points through nonparametric regression, the method comprising:

receiving a training data set in an n-dimensional space, wherein the training data set represents normal system data values from a system, wherein the normal system data values are collected from a system with a known-good behavior pattern;

defining a set of regression primitives in the n-dimensional space, wherein a regression primitive in the set passes through N data points in the training data set, wherein $N \geq n$;

logically combining the set of regression primitives to produce a convex envelope F, wherein logically combining the set of regression primitives involves using R-function operations by, for each subset of (N−1) data points in the training data set, grouping a subset of regression primitives in the set which pass through the (N−1) data points; and performing an R-conjunction operation on the subset of regression primitives to produce a combined functional relationship associated with the (N−1) data points; and performing an R-disjunction operation on a set of combined functional relationship associated with different subsets of (N−1) data points in the training data set to produce the convex envelope F, such that for each point p in the n-dimensional space: $F(p)=0$ if p is on the convex envelope, $F(p)<0$ if p is inside the convex envelope, and $F(p)>0$ if p is outside the convex envelope;

obtaining the functional relationship approximation by computing an argument of the minimum of F in the n-dimensional space, wherein the functional relationship approximation is constructed based on the training data set, and wherein the functional relationship approximation enables prediction of normal system behavior; and using the functional relationship approximation to classify data from the system.

10. The computer-readable storage medium of claim 9, wherein classifying the data involves determining whether a telemetry signal from a computer system is deviating from a normal telemetry signal from the computer system.

11. The computer-readable storage medium of claim 9, wherein defining the set of regression primitives in the n-dimensional space involves iteratively:

selecting a set of N data points from the training data set; and generating a regression primitive which passes through the selected N data points, wherein between any two sets of selected N data points, there is at least one different data point in each of the sets.

12. The computer-readable storage medium of claim 9, wherein a regression primitive can be:
   a linear function; or
   a nonlinear function.

13. The computer-readable storage medium of claim 9,
   wherein a regression primitive defines a hyperplane $g(p)=0$ in the n-dimensional space;
   wherein the hyperplane $g(p)=0$ divides the n-dimensional space into three regions such that for each point p:
   $g(p)=0$ if p is on the hyperplane;
   $g(p)<0$ if p is on one side of the hyperplane; and
   $g(p)>0$ if p is on the other side of the hyperplane.

14. The computer-readable storage medium of claim 9,
   wherein an R-function is a function whose sign can change if and only if the sign of one of its arguments changes; and
   wherein the R-function operations mimic logical operations.

15. The computer-readable storage medium of claim 9, wherein each data point in the training data set comprises:
   one dependent variable y; and
   (n−1) independent variables x;
   wherein the value of y is functionally related to the values of x.

16. The computer-readable storage medium of claim 15, wherein prior to defining the set of regression primitives, the method further comprises preprocessing the received training data set which involves:
   receiving a query point $x=x_0$;
   selecting k-nearest-neighbors of $x_0$ from the training data set; and
   replacing the training data set with the k data points associated with the k-nearest-neighbors of $x_0$.

17. A hardware apparatus that constructs a functional relationship approximation from a set of data points through nonparametric regression, comprising:
   a receiving mechanism configured to receive a training data set in an n-dimensional space, wherein the training data set represents normal system data values from a system, wherein the normal system data values are collected from a system with a known-good behavior pattern;
   a fitting mechanism configured to define a set of regression primitives in the n-dimensional space, wherein a regression primitive in the set passes through N data points in the training data set, wherein $N \geq n$;
   a logic operation mechanism configured to logically combine the set of regression primitives to produce a convex envelope F, by using R-function operations to produce the convex envelope F, by, for each data point d in the training data set, grouping a subset of regression primitives in the set which pass through d; and
   performing an R-conjunction operation on the subset of regression primitives to produce a combined functional relationship associated with d; and
   performing an R-disjunction operation on a set of combined functional relationship associated with different d to produce the convex envelope F, such that for each point p in the n-dimensional space: $F(p)=0$ if p is on the convex envelope, $F(p)<0$ if p is inside the convex envelope, and $F(p)>0$ if p is outside the convex envelope;
   an computing mechanism configured to obtain the functional relationship approximation by computing an argument of the minimum of F in the n-dimensional space, wherein the functional relationship approximation is constructed based on the training data set, and wherein the functional relationship approximation enables prediction of normal system behavior; and
   an applying mechanism configured to use the functional relationship approximation to classify data from the system.

18. The apparatus of claim 17, wherein the applying mechanism is further configured to use the functional relationship approximation to determine whether a telemetry signal from a computer system is deviating from a normal telemetry signal from the computer system.

19. The apparatus of claim 17, wherein the fitting mechanism is configured to:
   select a set of N data points from the training data set; and to
   generate a regression primitive which passes through the selected N data points,
   wherein between any two sets of selected N data points, there is at least one different data point in each of the sets.

20. The apparatus of claim 17,
   wherein an R-function is a function whose sign can change if and only if the sign of one of its arguments changes; and
   wherein the R-function operations are logical operations.

* * * * *